United States Patent
Pasquet et al.

(10) Patent No.: US 11,892,045 B2
(45) Date of Patent: Feb. 6, 2024

(54) METHOD FOR SEPARATING FRICTION MEANS FROM A BRAKING MEMBER

(71) Applicant: Foundation Brakes France SAS, Drancy (FR)

(72) Inventors: Thierry Pasquet, Vincennes (FR); Philippe Bourlon, Dammartin-en-Goële (FR)

(73) Assignee: FOUNDATION BRAKES FRANCE SAS, Drancy (FR)

( * ) Notice: Subject to any disclaimer, the term of this patent is extended or adjusted under 35 U.S.C. 154(b) by 289 days.

(21) Appl. No.: 16/972,885

(22) PCT Filed: Jun. 10, 2019

(86) PCT No.: PCT/EP2019/065057
§ 371 (c)(1),
(2) Date: Dec. 7, 2020

(87) PCT Pub. No.: WO2019/243094
PCT Pub. Date: Dec. 26, 2019

(65) Prior Publication Data
US 2021/0254681 A1 Aug. 19, 2021

(30) Foreign Application Priority Data
Jun. 18, 2018 (FR) ...................................... 1855340

(51) Int. Cl.
*F16D 65/00* (2006.01)
*F16D 65/092* (2006.01)

(52) U.S. Cl.
CPC ....... *F16D 65/0031* (2013.01); *F16D 65/092* (2013.01)

(58) Field of Classification Search
CPC ............... F16D 65/0031; F16D 65/092; F16D 65/0081; B60T 1/065
See application file for complete search history.

(56) References Cited

U.S. PATENT DOCUMENTS

| | | | | |
|---|---|---|---|---|
| 5,162,053 | A * | 11/1992 | Kowalski, Jr. | .......... B08B 17/00 55/467 |
| 9,885,396 | B2* | 2/2018 | Kunzler | .................... B03C 3/41 |
| 2002/0166311 | A1* | 11/2002 | Maricq | .................... B03C 1/23 55/385.3 |

(Continued)

FOREIGN PATENT DOCUMENTS

| DE | 102008029504 | 4/2015 |
|---|---|---|
| FR | 2815099 A1 | 4/2002 |

(Continued)

OTHER PUBLICATIONS

Korean Patent No. KR 20200037013 to Cho et al published Apr. 8, 2020.*

(Continued)

*Primary Examiner* — Pamela Rodriguez
(74) *Attorney, Agent, or Firm* — M&B IP Analysts, LLC

(57) ABSTRACT

A braking device for a vehicle is provided. The braking device includes a braking member, friction components that are adapted to come into contact with the braking member, and an air supply line secured to the friction parts and opening out opposite the braking member.

8 Claims, 1 Drawing Sheet

(56) References Cited

U.S. PATENT DOCUMENTS

2014/0262633 A1   9/2014   Kunzler et al.

FOREIGN PATENT DOCUMENTS

GB   2492858 A   1/2013
GB   2533476 A   6/2016

OTHER PUBLICATIONS

French Patent No. FR 3093779 to Arnault et al published Sep. 18, 2020.*
The International Search Report and the Written Opinion of the International Searching Authority for PCT/EP2019/065057, dated Sep. 12, 2019, ISA/EPO, Rijswijk, The Netherlands.
Office action for BR 114687/GB/AUB/SCH dated Feb. 11, 2022. European Patent Office, Munich Germany.

* cited by examiner

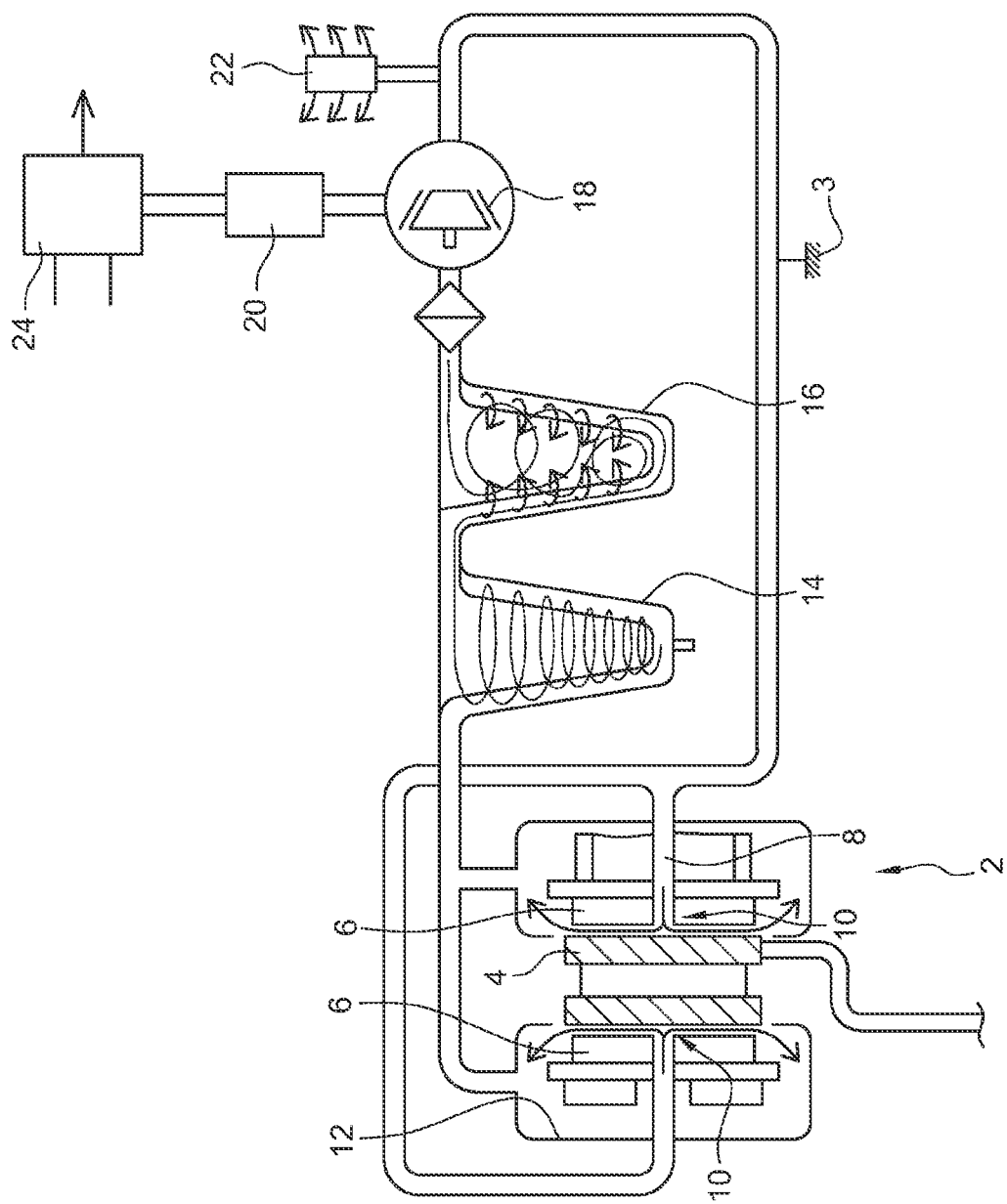

METHOD FOR SEPARATING FRICTION MEANS FROM A BRAKING MEMBER

CROSS-REFERENCE TO RELATED APPLICATIONS

This application claims priority under 35 U.S.C. § 371 to the International Application No. PCT/EP2019/065057, filed Jun. 10, 2019, and to the French Application No. 1855340, filed Jun. 18, 2018, now pending, the contents of which are hereby incorporated by reference.

TECHNICAL FIELD

The present disclosure relates to a vehicle braking system, and more particularly, to a braking member and friction means for a vehicle braking system.

BACKGROUND

A braking system is for example a disc braking system more commonly called a "disc brake" or a drum braking system more commonly called a "drum brake". It generally comprises friction means connected to an actuation member adapted to move the friction means towards a braking member secured to a vehicle wheel. The objective is to place the friction means, for example brake linings or pads, in contact with the braking member to brake the vehicle by friction or to move them away from the braking member in order to stop braking. The actuation member is generally coupled to transmission means intended to drive the displacement of the friction means using the energy supplied by the actuation member. When the braking system is a disc brake, the braking member consists of a disc which rotates with the wheel. If the braking system is a drum brake, the braking member consists of a drum which rotates with the wheel.

In some cases, the actuation member is not efficient enough to separate the friction means from the braking member after braking. This may be caused by the friction means sticking to the braking member, resulting in friction between these two elements. Braking may therefore last longer than desired.

SUMMARY

The disclosed embodiments aim to remedy this disadvantage by improving the separation of the friction means from the braking member.

The disclosed embodiments therefore relate to a braking device for a vehicle, comprising:
  a braking member,
  friction means that can come into contact with the braking member,
  an air supply line secured to the friction means and opening out opposite the braking member, and
  generally plate-shaped reception members surrounding the friction means, arranged to capture residues of friction between the friction means and the braking member.

Thus, the friction means can be separated from the braking member by sending an air flow towards the braking member through the line. Since the friction means are separated from the braking member by the line, we understand that this device is easy to manufacture and to arrange. In addition, this type of separation proves to be more efficient that traditional separation devices. Moreover, since air is used, the device has a very low operating cost in terms of resources, which helps to make it economical and ecological. Furthermore, the reception members control the dispersion of friction residues, thereby avoiding any pollution of the outside environment. In particular, this reduces the emissions of carbon dioxide from the vehicle.

Preferably, the line is directed so that an air flow leaving the line carries away the residues captured by the reception member.

The air flow therefore performs two functions. Firstly it separates the friction means from the braking member, and secondly it carries away the friction residues in order to clean the braking device.

Advantageously, the device further comprises at least one cyclone located downstream from the braking member relative to a flow direction of the air supplied by the line.

The air flow leaving the line can therefore be filtered to remove particles. This is especially advantageous if the air flow has carried away the friction residues generated while braking.

Advantageously, the device further comprises a turbine and a motor coupled to the turbine, located downstream from the braking member relative to a flow direction of the air supplied by the line.

The turbine and the motor thus increase the pressure of the air flow so that it separates the friction means from the braking member more efficiently.

Advantageously, the device further comprises a filter located downstream from the braking member relative to a flow direction of the air supplied by the line.

The air flow leaving the line can therefore be filtered to remove particles such as friction residues. If the device comprises a cyclone as mentioned above, the filter can carry out additional filtering of the air flow, in particular to filter any particles not captured by the cyclone.

Advantageously, the device is arranged so that at least some of the air leaving the line is reintroduced into the line.

The air used is therefore recycled in the device. Thus, the line is supplied with air more easily, thereby simplifying the device.

The disclosed embodiments also provide for a method for separating friction means from a braking member of a vehicle, in which a line secured to the friction means directs an air flow towards the braking member, generally plate-shaped reception members surrounding the friction means being arranged to capture residues resulting from friction between the friction means and the braking member.

Advantageously, the air flow is directed within a predetermined delay after braking of the vehicle has taken place.

By directing the air just after braking, the air flow is directed precisely when it is required. In other words, the time during which the device is used is optimized.

DETAILED DESCRIPTION

We will now describe an embodiment as a non-limiting example referring to the only FIGURE attached, FIG. 1, which is a diagram illustrating a braking device 2 according to an embodiment.

The braking device 2, typically a hydraulic disc brake with floating caliper, comprises a frame 3 and a braking member 4 consisting in this case of a disc secured to a vehicle wheel (not shown) and friction means 6. In this case, the friction means consist of two brake linings or pads connected to the frame 3 and slidably mounted relative to the braking member 4. More particularly, the friction means 6 are intended to come into contact with the respective opposite flat faces of the braking member 4 which extends between the friction means 6.

Braking of the vehicle takes place traditionally.

When the vehicle is moving, the friction means 6 are not in contact with the braking member 4.

If the vehicle driver uses a braking actuation member, for example a brake pedal, typically a hydraulic piston associated with a device for generating pressure in a brake fluid slides the friction means 6 towards the braking member 4 until they come into contact with it. Since the braking member 4 is secured to the vehicle wheel, this contact creates friction between the friction means 6 and the braking member 4, thereby converting the kinetic energy of the wheel into heat. This decreases the speed of rotation of the wheel and therefore slows down the vehicle.

Once the vehicle speed has decreased to a value required by the driver, he/she stops actuating the braking actuation member. The braking member 4 and the friction means 6 are no longer in contact, so there is no longer any friction between them. The vehicle stops slowing down.

The braking device 2 could also be intended not to slow down the vehicle but to keep it stationary. In this case, the braking device 2 would be controlled by a locking member such as a handbrake also called a "parking brake".

The braking device 2 comprises a line 8 formed in the frame 3. The line 8 is intended to direct an air flow towards the braking member 4. Thus, the line 8 has two ejection nozzles 10 surrounded by friction means 6 and secured thereto, as shown on FIG. 1. The ejection nozzles 10 open out opposite the braking member 4.

The purpose of the air flow is to separate the friction means 6 from the braking member 4, especially after braking as explained above. When the vehicle driver decides to stop braking, these two elements must be separated so that they stop generating a friction torque which would slow down the vehicle more than necessary and would increase the fuel consumption and the wear of the friction elements. Thus, the braking device 2 is arranged so that, within a predetermined delay after braking, for example approximately one tenth of a second, an air flow is directed from the line 8 towards the braking member 4. Since the line 8 is secured to the friction means, the air flow generates a force which tends to separate the friction means 6 from the braking member 4 to allow the air to pass. Due to its configuration, we understand that the braking device can be controlled by either a wired network or a wireless system.

The braking device 2 advantageously comprises reception members 12 arranged to capture residues resulting from friction between the friction means 6 and the braking member 4. As shown on FIG. 1, there are in this case two generally plate-shaped reception members 12 surrounding the friction means 6 in order to capture the largest possible quantity of friction residues. Furthermore, this shape allows the air flow to be guided by the reception members 12 so that it can carry away the friction residues before being reintroduced into the line 8 through other openings. We therefore understand that the air flow performs the additional function of capturing the friction residues, which is independent of its first function of separating the friction means 6 from the braking member 4.

The braking device 2 advantageously comprises at least one cyclone located downstream from the braking member 4 relative to a direction of the air flow. In this case, there are two cyclones arranged in series. A first cyclone 14 is designed to separate liquid drops, in particular water drops, from the air flow. A second cyclone 16 is designed to separate friction residues carried by the air flow and of sufficiently large size.

The braking device 2 comprises a turbine 18 located downstream from the cyclones 14, 16 relative to the direction of the air flow. The turbine 18 is coupled to a motor 20, for example a BLDC (BrushLess Direct Current) motor, in a known manner to increase the pressure of the air flow passing through the turbine 18. The motor is controlled by a control member 24. In particular, it is possible to set the pressure increase to a chosen and controlled value.

The braking device 2 comprises a filter 22 located downstream from the turbine 18 relative to the direction of the air flow. The filter 22 separates the remaining friction residues in the air flow which were not separated by the second cyclone 16. At the output of the filter 22, the air flow contains a very small quantity of friction residues.

As shown on FIG. 1, the line 8 consists of an almost closed loop, since the air flow can only leave after the ejection nozzles 10. And even in this case, the braking member 4 and the reception members 12 are arranged to direct the air flow so that it is reintroduced into the line 8. In other words, the braking device 2 is arranged so that at least some of the air leaving the line 8 is reintroduced into the line 8. Thus, the air flow takes the following path: it leaves the ejection nozzles 10 and is diverted by the braking member 4 and the reception members 12, a large proportion of the air flow is reintroduced into the line 8, passes through the two cyclones 14, 16, the turbine 18 then the filter 22 before being reinjected via the injection nozzles 10.

The present disclosure is not limited to the embodiment described and other embodiments will be clearly apparent to those skilled in the art. According to an alternative embodiment, the friction means are separated from the braking member not by directing an air flow towards the braking member but by creating a depression to attract the friction means in order to move them away from the braking member. In this case, the line is not secured to the friction means.

PARTS LIST

2: braking device
3: frame
4: braking member
6: friction means
8: line
10: ejection nozzle
12: reception member
14: first cyclone
16: second cyclone
18: turbine
20: motor
22: filter
24: control member

What is claimed is:

1. A braking device for a vehicle, wherein the braking device comprises:
   a braking member,
   friction means that are adapted to come into contact with the braking member,
   an air supply line secured to the friction means and opening out opposite the braking member, wherein the air supply line is adapted to direct an air towards the braking member, and
   generally plate-shaped reception members, wherein the reception members form a cavity surrounding the friction means, wherein the reception members are arranged to capture residues of friction between the friction means and the braking member.

2. The braking device according to claim 1, wherein the line is directed so that an air flow leaving the line carries away the residues captured by the reception members.

3. The braking device according to claim 1, further comprising at least one cyclone located downstream from the braking member relative to a flow direction of the air supplied by the line.

4. The braking device according to claim 1, further comprising a turbine and a motor coupled to the turbine, located downstream from the braking member relative to a flow direction of the air supplied by the line.

5. The braking device according to claim 1, further comprising a filter located downstream from the braking member relative to a flow direction of the air supplied by the line.

6. The braking device according to claim 1, wherein the braking device is arranged so that at least some of the air leaving the line is reintroduced into the line.

7. A method for separating friction means from a braking member of a vehicle, comprising:

directing, via a line secured to the friction means, an air flow towards the braking member, wherein generally plate-shaped reception members form a cavity surrounding the friction means, wherein the reception members are arranged to capture residues resulting from friction between the friction means and the braking member.

8. The method according to claim 7, wherein the air flow is directed within a predetermined delay after braking of the vehicle has taken place.

* * * * *